Feb. 3, 1953     I. A. GREENWOOD, JR., ET AL     2,627,183
PRESSURE TRANSLATOR
Filed June 17, 1948                                             2 SHEETS—SHEET 1
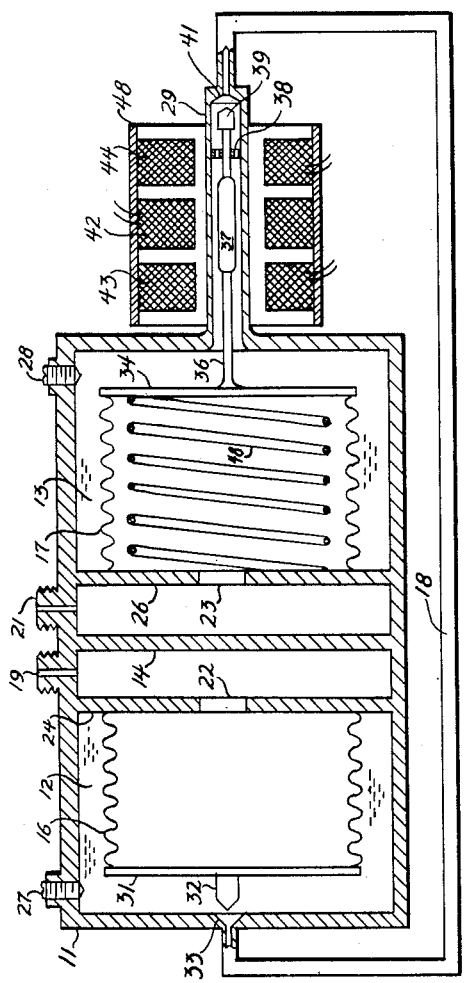
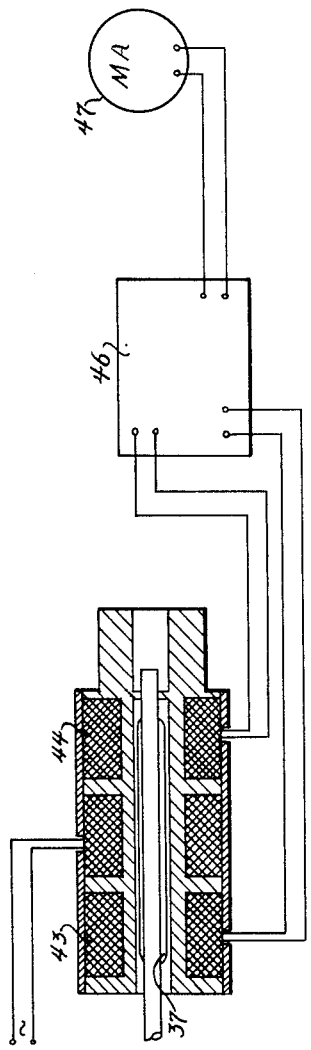
IVAN A. GREENWOOD, Jr.
HERBERT ZIEBOLZ
ALLEN CHAPLIN
INVENTORS
BY *W. S. Mackey*
ATTORNEY Feb. 3, 1953     I. A. GREENWOOD, JR., ET AL     2,627,183
PRESSURE TRANSLATOR
Filed June 17, 1948     2 SHEETS—SHEET 2

IVAN A GREENWOOD, Jr.
HERBERT ZIEBOLZ
ALLEN CHAPLIN
INVENTORS

BY *H. T. Mackey*

ATTORNEY

Patented Feb. 3, 1953

2,627,183

UNITED STATES PATENT OFFICE 2,627,183

PRESSURE TRANSLATOR

Ivan A. Greenwood, Jr., Pleasantville, N. Y., Herbert Ziebolz, Chicago, Ill., and Allen L. Chaplin, Oreland, Pa., assignors to General Precision Laboratory Incorporated, a corporation of New York Application June 17, 1948, Serial No. 33,503

6 Claims. (Cl. 73—393)

The present invention relates to a differential pressure translating device for use in measuring or controlling pressure differentials.

When metering flowing fluids by means of a primary device such as an orifice, Venturi tube or Pitot tube, an instrument sensitive to the difference of two fluid pressures is required, capable of actuating a dial recorder or servo equipment to indicate, record, or control the fluid flow. Such an instrument is also adapted to indicate, record, or control liquid level and in general for operation on any two fluid pressures however derived, whether of two like or unlike fluids.

Such an instrument has a pressure-sensitive element, commonly a diaphragm or bellows or combination thereof, together with restoring elements to oppose the differential fluid force, with the motion of the diaphragm or bellows combination transmitted mechanically or electro-mechanically to an indicating device such as a needle moving over a dial, or to recording or controlling equipment.

It has been a defect of such devices that in transmitting the mechanical motion of the diaphragm or bellows, shafts with stuffing boxes were often employed, the friction of which limited the sensitivity and accuracy of the meters and by their nature were liable to leakage.

Another difficulty with such devices when employing electrical transmission of the motion of the sensitive element has been the exposure of the electrical transmitter to dirt and to the actuating fluid, which might be either corrosive, an electrical conductor, or both.

Still another hazard in the use of such devices was the liability to rupture of the diaphragm or bellows in case of excessive increase of one of the two actuating pressures, or on the other hand excessive reduction or loss of but one of the two pressures. In either case the increased differential pressure would destroy or permanently injure the sensitive element, or if the latter were made strong enough to withstand any possible overpressure, its sensitivity to small differentials would be greatly reduced.

A primary object of this invention is to provide a differential measuring device which translates the difference between two fluid pressures into an electrical signal, in which translation no mechanical stuffing boxes are employed.

Another object of this invention is the separation of all electrical parts from contact with the actuating fluid or fluids to escape corrosion, deterioration of insulation, and dirt.

Another object of the invention is to provide a device which is substantially unaffected by temperature changes.

Still another object of the invention is to provide a device containing a protective, substantially incompressible liquid, which device is responsive to the differential between two pressures, such as for example, the differential between the pressures upstream and downstream with respect to an orifice, nozzle or Venturi tube, the device being so constructed that if either pressure acts on the device alone without the other pressure acting in opposition thereto, the device will be adequately protected against destruction or permanent distortion, and will resist abusive conditions which would prevent an accurate reading being obtained when normal operating conditions should be resumed, but a device which nevertheless is highly sensitive to differentials in pressure even of very small magnitude. That is, in this device sensitivity is not sacrificed in order to insure against destruction or permanent distortion under conditions of abuse.

In one preferred embodiment of the invention two bellows are connected to opposite sides of a partition in a pressure chamber. The partition is tripartite, in effect containing two canals or ducts for the actuating pressures, one into each of the bellows. One bellows head carries an external rod which, moving longitudinally with the motion of the head, operates a signal generator. The two ends of the pressure chamber are connected by a pipe and both they and it are filled with a stable non-corrosive liquid, for example, transformer oil, one function of which is to connect the two bellows heads hydraulically so that movement of one will be communicated to the other. Each head carries a hydraulic valve disc which seats in the pipe opening, serving as both a mechanical stop and a trap for the liquid, so that upon movement to the stop damage to the bellows is prevented by the resistance of the substantially incompressible entrapped fluid.

One bellows contains an internal compression-tension spring; the other bellows contains no spring and since the spring constant of the bellows is small compared to that of the compression-tension spring thermal expansion is permitted without affecting the calibration.

The signal generator is preferably an electrical transformer having an alternating current primary and two secondaries, one at each end, with a magnetic armature of high permeability, operated by the rod mentioned above. The difference of the output voltages can then be made directly dependent on the position of the armature and this output difference therefore becomes a signal which may indicate the numerical difference in the fluid pressure within the two parts of the pressure chamber. Of course, those skilled in the art will appreciate that in place of the described electrical transmitter any other type of signal generator may be used. The signals may be interpreted by various means and may be utilized either to indicate the quantity being measured or through well-known control means such as amplifiers, servos and motors to maintain the measured quantity at a desired value. Interpretation and utilization of these signals, however, form no part of the present invention.

Although the measurement of differential pressure is used as an illustration, it is obvious that a single pressure alone can be measured as well.

In another preferred embodiment two assemblies of bellows, restoring spring and electrical transmitter are connected by a pipe filled with a non-corrosive fluid, the function of which is to connect the two bellows heads hydraulically as before. Actuating pressures are applied to the outsides of the bellows and thermal changes produce opposite and therefore cancelling movements of the electrical transmitters, while differential pressure produces movements of the two electrical transmitters both in the same direction, resulting in an additive signal.

The exact nature of the invention will be more clearly understood from the following detailed description when taken together with the accompanying drawings, in which:

Figure 1 shows one form of the invention utilizing two differential fluid pressure measuring bellows and a direct-connected electrical signal generator.

Figures 3 and 4 show preferred forms of electrical signal generator with one method of utilization of the signal schematically represented.

Figure 2:
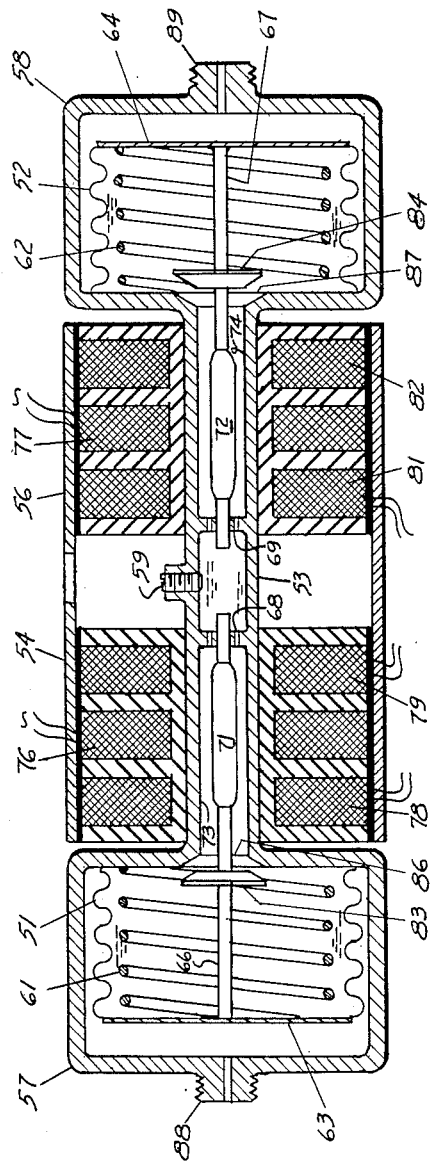
Figure 2 shows another form of the invention utilizing two differential fluid pressure measuring bellows and two direct-connected electrical signal generators.

In Figure 1 two bellows 16 and 17 are connected hydraulically through piping 18 so that under internal differential pressure they move in concert, actuating an electrical signal generator.

The two bellows are contained in two chambers 12 and 13 of a vessel 11, the two chambers being separated by an imperforate partition 14. Since this partition is imperforate, vessel 11 may be separated if desired into two vessels by cutting vertically through the center of partition 14, each vessel containing then one of the two chambers 12 and 13 and being separable by any desired reasonable length of piping 18. Actuating fluid pressures connected at nipples 19 and 21 are led through passages 22 and 23 in bellows supports 24 and 26 to the interiors of the bellows. Filler plugs 27 and 28 are provided for filling the spaces surrounding the bellows with a hydraulic liquid. Preferably this liquid should completely fill all space exterior of the bellows and also should fill extension 29 of chamber 13 and piping 18 which hydraulically connect chamber 13 with chamber 12. The hydraulic liquid is preferably incompressible, non-corrosive, and highly fluid, such as transformer oil. In applications where the device is required to endure relatively high temperature, a special liquid may be employed such as a silicone, a specially treated petroleum product, or the like.

Bellows 17 contains a compression-tension restoring spring 48. Bellows head 31 carries a short rod 32, the end of which serves as both a limit stop and as a hydraulic stop valve engaging seat 33 to seal the end of hydraulic tube 18. Likewise bellows head 34 carries a long rod 36 operating axially in a sliding bearing 38, supporting armature 37 of high magnetic permeability and terminating in a valve disc 39. This disc serves as both a limit stop and as a hydraulic stop valve and engages seat 41 to seal the end of hydraulic tube 18. Armature 37 operating within chamber extension 29, which is made of non-magnetic material, is preferably surrounded by a transformer 48 containing a primary winding 42 and two secondary windings 43 and 44. However, it is obvious that other types of electrical signal generators may be employed, such as those mentioned in the copending application, Serial No. 33,504, filed June 17, 1948, entitled Pressure Translator, of Ziebolz, Greenwood and MacLea.

The operation of transformer 48 as a signal generator is as follows. The primary is continuously energized with alternating current of any desired frequency, for example, 60 cycles. When the armature 37 is centered, equal voltages are induced in secondary windings 43 and 44, but when the armature 37 is moved toward winding 43, its induced voltage is increased while that in winding 44 is decreased, and vice versa.

Figure 3 indicates how these voltages may be utilized. Secondary windings 43 and 44 are shown connected to a differential amplifier 46, the differential output of which is shown actuating a milliammeter 47 but might actuate any other suitable indicating instrument or any recording instrument or servo control equipment, the utilization of the signal generator's output not being a part of this invention. A relative increase in the output of winding 43 will make meter 47 indicate proportionally in one direction, and a relative increase in the output of winding 44 will make meter 47 indicate proportionally in the opposite direction, so that the meter indications represent the axial positions of armature 37.

As an aid in understanding the operation of this invention let it be supposed that the difference between the pressures in two steam lines is to be measured with accuracy. One carries a pressure of 650 pounds per square inch and is connected through nipple 21, Fig. 1, to bellows 17; the other carries a pressure of 649 pounds per square inch and is connected through nipple 19 to bellows 16. Both bellows being connected hydraulically so that they must move in concert, will then move to the right until the excess or differential pressure of one pound per square inch by which one pressure exceeds the other is counterbalanced by the counterforce of spring 48, and the movement therefore stops. This movement is communicated from head 34 through rod 36 to armature 37 producing a proportional differential electrical signal in transformer windings 43 and 44 which may be utilized as before described. The pressures of approximately 650 pounds per square inch, although impressed on both lightly-constructed bellows, do not rupture them because they are hydraulically supported on their reverse sides by the liquid surrounding them. This liquid of course, being confined, develops a resistive pressure exactly equal to the 650 pound per square inch operating pressure, preventing any disruptive stress on the bellows.

In the event that an overload is placed on the device either by a great decrease in the pressure in one chamber with respect to the other or, conversely, by an undue increase in one as respects the other, the increased difference in pressure acting on the bellows 16 and 17 might become so great as to injure or destroy the mechanism. The hydraulic valves and stops 32 and 39 and the fluid filling of the assembly, however, prevent injury in case of such overload and permit the use of a low spring constant and of delicate and sensitive bellows devices, while at the same time provide an apparatus which is rugged and capable of standing harsh treatment.

Suppose, for example, due to carelessness, improper operation, or some other reason the pressure in bellows 16 were suddenly decreased to zero while the pressure in bellows 17 should remain at 650 pounds per square inch, which would be sufficient to destroy even the most rugged device of this nature, let alone one delicate enough to measure a differential pressure of a pound or less. When, however, this untoward event occurs in the device of this invention this great difference in pressure will cause the bellows 16 and 17 to move to the right to such an extent that the valve 39 seats on the valve seat 41, preventing further motion of the assembly and also sealing the orifice 41, preventing any further flow of fluid from the bellows chamber 13. Further movement of the bellows 17 is then rendered impossible because of the mechanical stoppage of the motion of head 34, rod 36 and valve 39 by contact of the latter with its seat. Moreover, engagement of the valve with its seat seals orifice 41 and entraps the incompressible liquid completely filling extension 29 and chamber 13 externally of the bellows. This liquid therefore supplies a hydrostatic pressure-resisting reaction which is a force equal in all directions and which counteracts the internal pressure imposed by the pressure of the fluid within bellows 17. The walls of the bellows 17 are, therefore, supported externally by this trapped liquid and they cannot be burst, distorted, or otherwise deformed by the undue difference in pressure within the two bellows.

If the overload occurs in the opposite direction either because of an undue drop in pressure within bellows 17 or an undue relative increase in pressure in bellows 16, it will be readily apparent that a similar action takes place but in the opposite direction. In such an instance bellows 16 will expand until valve 32 seats on aperture 33, stopping the leftward motion of head 31. When this occurs further liquid flow from chamber 12 to chamber 13 is prevented by the sealing of the orifice 33 and the trapped fluid remaining in chamber 12 acts as a support for the exterior of bellows 16, preventing its deformation or destruction, since regardless of the absolute pressures in bellows 16 and 17, the incompressible liquid completely filling chambers 12 and 13 exteriorly of the bellows and completely filling tube 18 acts as a counterforce which supports the walls of these delicate bellows at all times.

The construction shown in Fig. 1 provides for automatic compensation for variations in volume of liquid due to temperature variations of the liquid surrounding the bellows, whether caused by changes in ambient temperature or by changes in the temperatures of either or both actuating fluids entering the bellows through nipples 19 and 21. Accuracy of the device will thus be unaffected by temperature changes. The position of actuating rod 36 is controlled by calibrated compression-tension spring 48. This rod is connected to head 34, while head 31 is free of rigid connection to the rod. Thermal expansion or contraction of the liquid surrounding the bellows will therefore move bellows head 31 and not head 34, since the elasticity of the material of bellows 16 is negligibly small compared with the elasticity of spring 48 added to the elasticity of bellows 17. Any resulting movement of head 31 will change only the volume of the space within bellows 16, which is of no significance, and will not change the position of armature 37. Any change in differential pressure will, however, still be perfectly communicated by hydraulic transmission from head 31 through the liquid-filled tube 18 to head 34, moving it, its connected rod, and armature 37, resulting in production of a signal by the signal generator windings 43 and 44, and the magnitude of this signal will thus be independent of any temperature variations.

In Figure 2 two bellows 51 and 52 are connected hydraulically through piping 53, so that under external differential pressure they move in concert, actuating two electrical signal generators 54 and 56. The two bellows are contained in two chambers 57 and 58, at opposite ends of a symmetrical unitary construction. It is obvious, however, that principally by elongation of tubing 53 the unitary construction of Fig. 2 could be changed to two-unit construction without changing the functioning of the device, or by extension of the length of tubing 53 and by curving it, chambers 57 and 58 could be combined back to back or side by side to constitute a single vessel of two chambers.

The space within the bellows and the tubing 53 connecting their interiors is filled with liquid which may be of the nature described in connection with Fig. 1, opening 59 being provided for filling these spaces with the liquid. Each bellows contains a calibrated compression spring, 61 and 62, for use as measurement reference. In place thereof, however, it is obvious that if desired the elasticity of the bellows material itself may be employed. Each bellows head, 63 and 64, carries an actuating rod, 66 and 67, extending axially through the bellows into a space outside its chamber and connecting with tubing 53. The portion of each rod outside its chamber is supported by a sliding bearing 68 and 69, and carries the actuating mechanism which may be of any desired type including those described in the copending application, Serial No. 33,504, filed June 17, 1948, entitled Pressure Translator, of Ziebolz, Greenwood and MacLea, but is preferably of the electromagnetic type as described in connection with Fig. 1. In such a generator each actuating rod carries a magnetically permeable armature, 71 and 72, operating within a non-magnetic extension 73 and 74, of chambers 57 and 58 respectively. Outside each non-magnetic tubular chamber extension 73 and 74, are transformer windings, each set including a primary winding, 76 and 77, connected to an alternating current supply of, for example, 60 cycles frequency, and two secondary windings, 78, 79, 81 and 82. These windings are connected as illustrated schematically in Fig. 4, so that for movements in concert of the two bellows responsive to pressure differences, both armatures move in the same direction and the secondary voltages have additive effect to reinforce the magnitude of the differential signal, while for movements of the two bellows in opposite directions the voltage changes cancel each other. Each rod carries a valve disc, 83 and 84, seating on valve seat 86 and 87 to seal the exit from each chamber into the signal generator extension.

Figure 4:
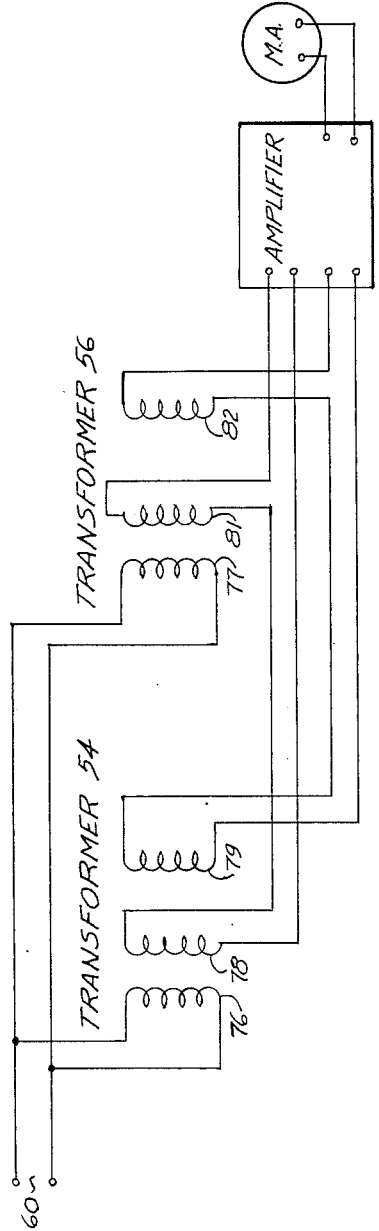

As an aid in understanding the operation of this invention let it be supposed that the one-pound difference between two steam pressures of 650 and 649 pounds per square inch is to be measured with accuracy. The first steam line is connected through nipple 88 to chamber 57 and the other is connected through nipple 89 to chamber 58. Since the two bellows are hydraulically linked through tubing 53 so that they must move together, bellows head 63 will move toward the right, forcing head 64 likewise to move toward the right until a force of one pound has been built up in spring 61, stopping the motion. This movement meanwhile is communicated through rods 66 and 67 to armatures 71 and 72, producing a proportional signal output from each of the transformers, which outputs, added in any adding circuit such as that shown in Fig. 4, are available to produce an indication, a record, or a servo control representative of the differential pressure. The high pressures do not rupture the bellows because of the support given the latter at their inner surfaces by the fluid filling them, as described in connection with Fig. 1.

In the event that an overload is placed on the device by a great decrease in the pressure in one chamber with respect to the other, or conversely, by an undue increase in one as respects the other, the increased difference in pressures acting on the bellows 51 and 52 might become so great as to injure or destroy the mechanism were it not for the safety provision of this invention. This provision consists of the combined mechanical stops and hydraulic stop valves 83 and 84. Suppose the pressure in chamber 57 were decreased to zero while the pressure in chamber 58 remained at a high value such as 650 pounds per square inch. The difference of 650 pounds per square inch acting on the assembly would destroy both bellows were it not for valve 84. This valve will move to the left and stop on its seat 87, preventing further movement of either bellows. This valve in seating also will entrap the incompressible liquid with which bellows 52 is filled, preventing collapse or injury by any external pressure. An exactly similar action will occur should pressure in chamber 57 greatly exceed that in chamber 58, valve 83 seating on seat 86 to protect bellows 51.

The construction shown in Fig. 2 also provides for automatic compensation by an electrical method for variation in volume of the liquid due to temperature variations thereof. Accuracy is therefore unaffected by temperature variations. Thermal expansion or contraction of the incompressible liquid completely filling both bellows and the connection channel will necessarily move both bellows heads simultaneously, either both outward or both inward, and if the springs are equal in calibration the movements will be of the same amount. Since the two transformer outputs are additively connected for simultaneous movements in the same direction, movements of the two armatures in opposite directions will produce equal and opposite signals which therefore will cancel each other. Any change in differential pressure will still cause simultaneous movements of the armatures, both in the same direction, resulting in production of additive signals by the signal generators, and the accuracy will be unaffected by thermal effects.

The symmetry of the preferred embodiment shown in Fig. 2, with the provision of two separate calibrated springs, one for measurement of differential pressures when the pressure introduced at nipple 89 is greater than that introduced at nipple 88, and the other spring for measurement when it is less, permits the use of two different scales of measurement. For instance, if the spring constant or elasticity of one restoring spring were ten times that of the other, the differential pressure scale for one side could be made ten times as condensed as the scale for the other side.

What is claimed is:

1. A differential pressure device comprising, a first pressure chamber, a first bellows member affixed to a wall of said first pressure chamber having a free closed end portion extending into said chamber and dividing said chamber into two portions, means for admitting fluid under pressure to one of said portions whereby said pressure is exerted against said bellows member, a second pressure chamber, a second bellows member affixed to a wall of said second pressure chamber having a free closed end portion extending into said second chamber and dividing said second chamber into two portions, means for admitting fluid under pressure to one of the portions of said second chamber whereby said pressure is exerted against said second bellows member, a passageway connecting the remaining portions of said first and second pressure chambers, an incompressible liquid filling said passageway and said remaining portions of said first and second pressure chambers, a pair of rigid members each having one of their ends affixed to respective ones of the closed ends of said first and second bellows members and their opposite free ends extending into said passageway, separate valve means attached to each of said rigid members cooperating with valve seats formed in said passageway to seal said passageway on excessive movement of either of said bellows members, a first electrical signal generator operated by one of said rigid members, and a second electrical signal generator operated by the other of said rigid members.

2. A differential pressure device in accordance with claim 1 in which each of said electric signal generators comprises, a primary winding, a magnetic core attached to and operated by a respective one of said rigid members whereby the core is moved axially relative to said primary winding and at least one secondary winding in which electrical energy representative of said axial movement is induced.

3. A differential pressure device in accordance with claim 1 in which the output circuits of the said first and second electric signal generators are connected so that the generated signals are added for like directions of axial motions of said rigid members and subtracted for opposite directions of axial motions of said rigid members.

4. A differential pressure device in accordance with claim 1 in which said first bellows member is controlled in position by a first spring member and said second bellows member is controlled in position by a second spring member.

5. A differential pressure device in accordance with claim 1 in which said first and second springs are unequal, having different spring constants, whereby indicating, recording, or control utilizing equipment may have a scale on one side of zero differential pressure which is expanded by comparison with the scale on the other side of zero.

6. A differential pressure device in accordance with claim 1 in which said first bellows member is controlled in position by a first spring, and said second bellows member is controlled by a second spring having a spring constant equal to that of said first spring, and circuit means connecting said first electric signal generator with said second electric signal generator whereby their outputs are additive when said rigid members are moved simultaneously in the same direction, and subtractive when said rigid members are moved simultaneously in opposite directions, whereby temperature changes are prevented from affecting accuracy of output signals.

IVAN A. GREENWOOD, Jr.
HERBERT ZIEBOLZ.
ALLEN L. CHAPLIN.

REFERENCES CITED

The following references are of record in the file of this patent:

UNITED STATES PATENTS

| Number | Name | Date |
| --- | --- | --- |
| 1,239,565 | Collinson | Sept. 11, 1917 |
| 1,296,947 | Blot-Garnier et al. | Mar. 11, 1919 |
| 2,058,858 | Fetyko | Oct. 27, 1936 |
| 2,276,580 | Hofer | Mar. 17, 1942 |
| 2,361,788 | Neff | Oct. 31, 1944 |
| 2,400,048 | Jones | May 7, 1946 |
| 2,590,234 | Jones | Mar. 25, 1952 |

FOREIGN PATENTS

| Number | Country | Date |
| --- | --- | --- |
| 133,056 | Great Britain | Dec. 16, 1920 |
| 264,873 | Great Britain | June 23, 1927 |
| 325,651 | Great Britain | Feb. 27, 1930 |